United States Patent [19]

Newcomer

[11] 3,914,130
[45] Oct. 21, 1975

[54] PROCESS FOR ADDING PARTICULATE CELLULOSE TO ALKALI CELLULOSE

[75] Inventor: Michael Paul Newcomer, Lawrence, Kans.

[73] Assignee: E. I. Du Pont de Nemours & Company, Wilmington, Del.

[22] Filed: May 8, 1974

[21] Appl. No.: 468,196

[52] U.S. Cl. .................. 106/163; 260/217; 106/164
[51] Int. Cl.² ........................ C08L 1/02; C08L 1/24
[58] Field of Search .......................... 106/163–165; 260/217; 264/37

[56] References Cited
UNITED STATES PATENTS

| | | | |
|---|---|---|---|
| 1,552,422 | 9/1925 | Dasher | 106/264 |
| 2,172,109 | 9/1939 | Reichel et al. | 260/231 |
| 2,392,269 | 1/1946 | Schmitz | 260/233 |
| 3,817,983 | 6/1974 | Ten Boreck | 260/217 |

Primary Examiner—Theodore Morris

[57] ABSTRACT

In a process for the preparation of alkali cellulose comprising steeping cellulose pulp in an excess of caustic soda solution to produce alkali cellulose, removing excess caustic soda solution from the alkali cellulose, comminuting the alkali cellulose, adding ball-milled cellulosic material to the alkali cellulose to form a mixture thereof, and mechanically agitating the mixture, the improvement wherein the ball-milled material is added to the alkali cellulose by:

a. forming an air suspension, at atmospheric pressure, of ball-milled cellulosic material having a particle size less than about 120 microns;

b. feeding comminuted alkali cellulose into the suspended cellulosic material to form an intimate mixture thereof; and c. allowing the mixture to settle, whereupon the settled mixture is mechanically agitated.

8 Claims, 1 Drawing Figure

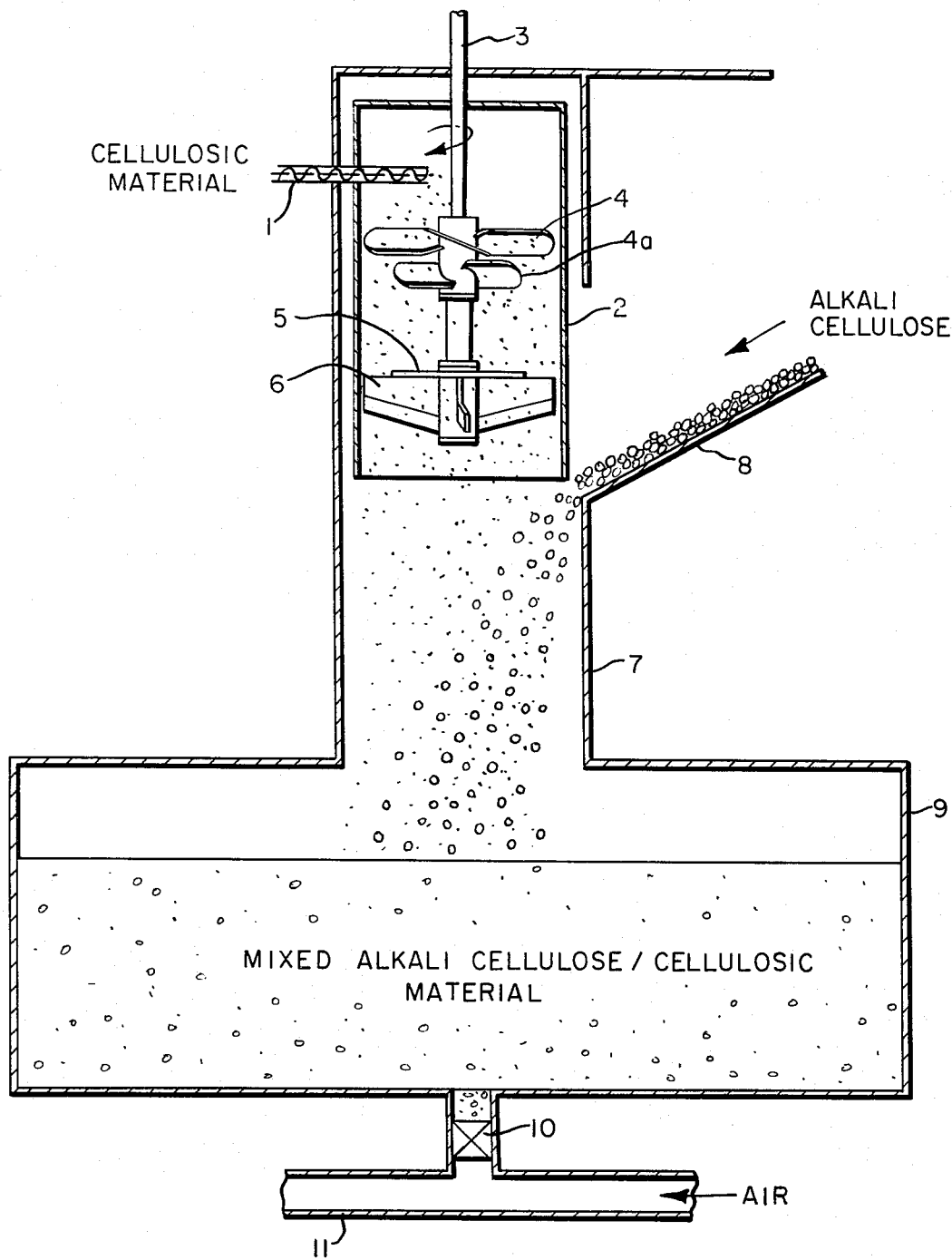

PROCESS FOR ADDING PARTICULATE CELLULOSE TO ALKALI CELLULOSE

BACKGROUND OF THE INVENTION

This invention relates to the preparation of alkali cellulose and, more particularly, relates to an improved process for adding ball-milled particulate cellulose to alkali cellulose.

U.S. Pat. No. 3,817,983 to TenBroeck and Laurance discloses a modified viscose process providing for the recycle of ball-milled regenerated cellulose waste after removal of coatings and softeners from the waste and/or addition of other ball-milled cellulosic material to the viscose process. The TenBroeck and Laurance process generally comprises:

1. steeping cellulose pulp in an excess of caustic soda solution to produce alkali cellulose;
2. removing excess caustic soda solution from the alkali cellulose, e.g., by expressing the excess in a press;
3. comminuting the alkali cellulose; and
4. adding ball-milled cellulosic material to the alkali cellulose before, during, or after aging of the alkali cellulose to form a mixture thereof.

The ball-milled cellulosic material assimilates with the alkali cellulose, whereupon the combined materials are treated with carbon disulfide and dissolved in a dilute caustic soda solution, in conventional manner, to prepare commercial grade viscose. The viscose, in turn, is processed in conventional manner to produce regenerated cellulose fiber or film.

The aforesaid patent discloses that intimate contact is desired between the added ball-milled cellulosic material and alkali cellulose particles to obtain uniform leaching of caustic and water by the ball-milled material from the alkali cellulose. To obtain this intimate contact, the patent further discloses that the ball-milled materials should be distributed to provide uniform coverage on the alkali cellulose, without excessive layering.

SUMMARY OF THE INVENTION

The present invention provides a process, especially adapted for continuous commercial operation, for adding ball-milled cellulosic material to alkali cellulose wherein a fine air suspension of the ball-milled material is formed, and then the air-suspended material is mixed with alkali cellulose to form an intimate mixture thereof. Accordingly, the present invention provides, in a process for the preparation of alkali cellulose by steeping cellulose pulp in an excess of caustic soda solution to produce alkali cellulose, removing excess caustic soda solution from the alkali cellulose, comminuting the alkali cellulose, adding ball-milled cellulosic material to the alkali cellulose to form a mixture thereof, and mechanically agitating the mixture, the improvement wherein the ball-milled cellulosic material is added to the alkali cellulose by:

a. forming an air suspension, at atmospheric pressure, of ball-milled cellulosic material having a particle size less than about 120 microns;
b. feeding comminuted alkali cellulose into the suspended ball-milled cellulosic material to form an intimate mixture thereof; and
c. allowing the mixture to settle, whereupon the settled mixture is mechanically agitated.

Since the process is conducted at atmospheric pressure, complex equipment such as a cyclone separator is not required and the process is readily integrated in a continuous commercial viscose manufacturing operation.

BRIEF DESCRIPTION OF THE DRAWING

The drawing is a vertical view, in partial cross section, of apparatus useful in carrying out the process of this invention.

DETAILED DESCRIPTION OF THE INVENTION

The present invention is an improved process for adding ball-milled cellulosic material to alkali cellulose, which process can be integrated in the viscose manufacturing process disclosed in U.S. Pat. No. 3,817,983 to TenBroeck and Laurance, incorporated herein by reference.

Ball-milled cellulosic materials which can be fed to the process include regenerated cellulose waste such as yarn and film wastes; wood pulp; wood pulp products, such as newspaper, paper bags, computer key punch cards, and writing paper; nontree cellulosic material, such as bagasse, cotton, kenaf, wheat straw, corn stalks, and the like; and mixtures thereof. When regenerated cellulose containing a softener or coating is selected, these components are removed using techniques known in the art prior to recycle. Likewise, other cellulose materials can be purified before use by conventional methods. The desirability of purifying the material depends generally on the end use of the resulting viscose. For example, if the viscose is to be used to make clear cellophane, then all agents that would color the final product should be removed.

After the cellulosic material has been ball-milled, as disclosed in U.S. Pat. No. 3,817,983, it is screened to obtain a dust which can readily be dispersed in air. Ball-milled cellulosic dust having a size such that 100% of the dust will pass through a 120 ASTM mesh screen (corresponding to a particle size less than 120 microns) is particularly suited for this purpose. The ball-milled cellulosic dust is then dispersed in air at atmospheric pressure.

Referring to the drawing, preferred apparatus for dispersing the dust has a screw conveyor 1 for feeding the dust to a dispersing device mounted within a dispersion chamber 2. The dispersion device has a rotatable shaft 3 having mounted thereon two propellers 4 and 4a, a solid disc 5, and a bank of vanes 6.

Each propeller has four blades with a 20° pitch, from horizontal, upward in the direction of rotation. The blades of each propeller are equally spaced on the shaft (90° apart), and the two propellers are offset by 45° so that the eight blades are spaced 45° apart around the shaft circumference. The propellers have an 11-inch diameter.

An 8-inch solid disc is mounted on the shaft about 5½ inches below the lower propeller. Immediately below the solid disc is a bank of four vanes spaced 90° apart around the shaft circumference. The plane of the vanes is in the vertical direction, except for the bottom edges which are slightly bent away from the direction of rotation. The diameter of the bank of blades is about 11½ inches.

The dispersion device is mounted in a stationary dispersion chamber 2 formed by a cylinder of 12 inches inside diameter which has an open bottom. The dispersion chamber is mounted in a larger mixing chamber 7, which surrounds the suspension chamber. A slide 8 is provided for the feed of alkali cellulose from an enclosed storage bin to a point in the mixing chamber below the open end of the suspension chamber. The bottom of the mixing chamber communicates with a holding tank 9, wherein the alkali cellulose and cellulosic material are held in contact, with mechanical mixing such as a screw mixer (not shown), to permit assimilation of the cellulosic material with the alkali cellulose. After the materials have been assimilated, they are withdrawn from the holding tank through a rotary air lock 10 and conveyed by air through line 11 to subsequent steps of the viscose process.

In operation, ball-milled regenerated cellulose having a particle size less than about 120 microns is fed to the dispersion chamber by the screw conveyor. Shaft 3 is rotated at sufficient speed, such as 500 to 600 rpm, so that the propellers draw ambient air into the dispersion chamber through the screw conveyor, or through openings in the chamber top, and force the ambient air and cellulosic material downward into the space between the propellers and solid disc 5. The solid disc and vanes cooperate to keep cellulosic material within this space, wherein the cellulosic material is airagitated, until so much cellulosic material is contained in the space that it is dispensed by the vanes into mixing chamber 7 in a highly dispersed, swirling spiral pattern.

Alkali cellulose is fed into the mixing chamber by an inclined slide 8 to disperse the feed across the path of decending cellulosic particles. The alkali cellulose has previously been comminuted to a fluff composed of fiber groups having a nominal cross-sectional dimension of about 0.25 to 3 inches to enhance contact with the cellulosic particles. Suspended cellulosic particles come into contact with the moist alkali cellulose as the particles settle, forming an intimate mixture thereof.

The intimate mixture then settles into holding tank 9 wherein water and caustic soda is leached from the alkali cellulose by the cellulosic particles to form a homogeneous mass. Mechanical mixing is provided to shorten the contact time in the holding tank. Material is continuously withdrawn from the holding tank through rotary air lock 10 and air conveyed to subsequent steps in the viscose process.

Maximum quantities of ball-milled cellulosic material added in this manner are governed by the amount of water and caustic in the alkali cellulose available for leaching. Namely, the ball-milled cellulosic material is added in an amount such that, during assimilation with the alkali cellulose, a sufficient, but not excessive, amount of water and caustic is leached from the alkali cellulose whereby the assimilated mass will xanthate and dissolve to form commercial grade viscose. For example, about 20 to 25 parts by weight of recovered regenerated cellulose and about 100 parts by weight of cellulose pulp have been added independently to 100 parts by weight of a typical alkali cellulose composition having about 15 to 16% alkalinity and 30 to 33% cellulose content and the mixture has then been xanthated and dissolved in conventional manner to prepare commercial grade viscose.

The process insures intimate contact between the ball-milled cellulosic material and alkali cellulose, thus minimizing contact time required for leaching and obviating excessive local leaching which can degrade the xanthation ability of the alkali cellulose. Since the process is conducted at atmospheric pressure, there is no need for cyclone separators or other costly equipment necessary to recover dispersed particles from the effluent of a pressurized disperser, such as an air eductor.

I claim:

1. In a process for the preparation of alkali cellulose comprising steeping cellulose pulp in an excess of caustic soda solution to produce alkali cellulose, removing excess caustic soda solution from the alkali cellulose, comminuting the alkali cellulose, adding at least one ball-milled cellulosic material selected from the group consisting of regenerated cellulose, wood pulp, wood pulp products, and nontree cellulosic material to the alkali cellulose to form a mixture thereof, and mechanically agitating the mixture, the improvement wherein the ball-milled material is added to the alkali cellulose by:
   a. forming an air suspension, at atmospheric pressure, of ball-milled cellulosic material;
   b. feeding comminuted alkali cellulose into the suspended cellulosic material to form an intimate mixture thereof; and
   c. allowing the mixture to settle, whereupon the settled mixture is mechanically agitated.

2. The process of claim 1 wherein the ball-milled cellulosic material has a particle size less than about 120 microns.

3. The process of claim 2 wherein the ball-milled cellulosic material is regenerated cellulose.

4. The process of claim 2 wherein comminuted alkali cellulose is fed into the path of descending suspended ball-milled material, forming a mixture of the alkali cellulose and ball-milled material.

5. The process of claim 4 wherein the comminuted alkali cellulose is a fluff composed of fiber groups having a nominal cross-sectional dimension of about 0.25 to 3 inches.

6. the process of claim 5 wherein the alkali cellulose has an alkalinity of about 15 to 16% and a cellulose content of about 30 to 33%.

7. The process of claim 6 wherein about 20 to 25 parts by weight of ball-milled regenerated cellulose are added to 100 parts by weight of alkali cellulose.

8. The process of claim 2 wherein the air suspension of ball-milled cellulosic material is formed by air turbulence.

* * * * *